(12) United States Patent
Muhlhoff

(10) Patent No.: US 6,834,694 B2
(45) Date of Patent: Dec. 28, 2004

(54) TIRE WITH REINFORCED SIDEWALLS

(75) Inventor: Olivier Muhlhoff, Clermont-Ferrand (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 38 days.

(21) Appl. No.: 10/353,418

(22) Filed: Jan. 29, 2003

(65) Prior Publication Data

US 2003/0136488 A1 Jul. 24, 2003

Related U.S. Application Data

(63) Continuation of application No. PCT/EP01/07952, filed on Jul. 10, 2001.

(30) Foreign Application Priority Data

Jul. 31, 2000 (FR) .............................................. 0010096

(51) Int. Cl.⁷ .......................... B60C 13/00; B60C 15/00
(52) U.S. Cl. ....................... 152/197; 152/454; 152/455; 152/541; 152/546; 152/550; 152/551; 152/553; 152/555
(58) Field of Search ................................ 152/197, 200, 152/454, 455, 516, 517, 541–543, 545, 546, 550, 551, 553, 555

(56) References Cited

U.S. PATENT DOCUMENTS

| | | | |
|---|---|---|---|
| 2,186,178 A | 1/1940 | Shoemaker | |
| 3,631,913 A | 1/1972 | Boileau | |
| 3,904,463 A | 9/1975 | Boileau | |
| 4,061,172 A | 12/1977 | Yoshida et al. | |
| 4,413,663 A | 11/1983 | Sullenger | |
| 6,276,416 B1 * | 8/2001 | Iwamura | 152/517 |

FOREIGN PATENT DOCUMENTS

| | | | |
|---|---|---|---|
| DE | 2357265 | 5/1975 | |
| FR | 1590025 | 4/1970 | |
| GB | 3276 | * of 1914 | 152/555 |

* cited by examiner

Primary Examiner—Adrienne C. Johnstone
(74) Attorney, Agent, or Firm—Burns, Doane, Swecker & Mathis, L.L.P.

(57) ABSTRACT

Tire comprising a carcass reinforcement of at least one ply of reinforcing elements parallel to one another within each ply and making with the circumferential direction an angle $\alpha$ such that $60°<\alpha<90°$, said ply being anchored in each bead to an anchoring element in the bead and each bead being connected radially to a tread by a sidewall comprising an inextensible reinforcement ring and a profiled element of rubber mixture located axially inside said ply and located radially between said anchoring element and said sidewall ring.

16 Claims, 1 Drawing Sheet

TIRE WITH REINFORCED SIDEWALLS

CROSS-REFERENCE TO RELATED APPLICATIONS

This is a continuation of international application No. PCT/EP01/07952 filed Jul. 10, 2001, which was published in French on Feb. 7, 2002 as WO 02/09955.

BACKGROUND OF THE INVENTION

1. Technical Field of the Invention

The invention concerns a tire with a semi-radial or radial carcass reinforcement, the tire being intended more particularly for fitting on vehicles that can roll at high speeds.

2. The Related Art

In the tire considered, the carcass reinforcement, whose reinforcing elements are inclined relative to the circumferential direction at angles between 80° and 90°, the reinforcement then being termed radial, or whose reinforcing elements are inclined relative to the circumferential direction at angles between 60° and 80°, the reinforcement then being termed semi-radial, is anchored in each bead to an anchoring wire or bead wire. The carcass reinforcement is covered radially by a crown reinforcement formed of at least two plies of reinforcing elements parallel to one another in each ply and crossed from one ply to the next, which make angles of small value relative to the circumferential direction. The crossed crown plies are generally completed radially on the outside by at least one ply of circumferential textile cables.

The sidewalls of the tire, containing radial or semi-radial reinforcing elements, are structurally the most flexible parts of the tire, since the elements have a strength that is generally calculated simply to withstand the tensile stresses imposed by the inflation pressure. In the case of the tires considered, moreover, the reinforcing elements are textile elements in by far the majority of cases, and are therefore quite incapable on their own of resisting compression stresses.

In the case of radial tires required to work at high speeds, problems arise when vehicles accelerate or brake abruptly, because the torque, which increases or decreases very rapidly, cannot be transferred directly to the tread of the tire which is in contact with the ground. For example, during a sudden acceleration the engine torque is transmitted from the wheel hub to the tire tread via the reinforcing elements of the carcass reinforcement. The resistance offered by the carcass reinforcement is insufficient and the reinforcing elements are subjected to deformations which cause the tire bead to rotate on the mounting rim of the tire without any torque transmission. A similar phenomenon arises in the case of emergency braking at high speed.

Various possibilities have been explored in the attempt to reduce the notorious insufficiency in relation to the above problems of the known radial tires: a first attempt was to reduce the ratio of the height of the tire to its maximum axial width; a second consisted in having a carcass reinforcement strengthened in the sensitive area of the tire sidewalls by the addition of supplementary reinforcements of crossed elements. The multiplication of additional reinforcement armatures in the sidewalls only partially solves the problems that arise, since the number and thickness of such reinforcements are limited in particular by the increase in weight, increases in the operating temperature, and the reduction of the rolling comfort to which they give rise.

To confer upon a tire, more particularly one with a radial carcass reinforcement, greater stability during rolling but without adverse effect upon comfort, U.S. Pat. No. 2,186,178 proposes to arrange at the junction between the bead and the sidewall of the tire an additional or secondary bead wire. The carcass reinforcement and additional reinforcement armatures are such that the two bead wires serve to anchor the reinforcements.

Patent FR 1 590 025, which is the equivalent of U.S. Pat. No. 3,631,913, adopts essentially the same principle, which it improves by adding an adapted carcass reinforcement section in the sidewall of the tire. When the tire is mounted on its operating rim and inflated to the recommended pressure, the portion of the carcass reinforcement adjacent to the tread extends as far as beyond the half-height of the sidewall, such that its distance from the median plane increases progressively and its meridian profile curves inwards relatively little, while the second portion interposed radially between the first portion and the bead wire that anchors the carcass reinforcement has a smaller radial height and a meridian profile with a relatively very marked inward curvature, the two portions described being joined by a second circumferential reinforcement in the form of a bead wire. The same principle of an additional bead wire located at the junction of the sidewall and the tire bead is also adopted by patent DE 2 357 265.

SUMMARY OF THE INVENTION

To preserve the well known advantages conferred by a high overall rigidity of the crown reinforcement of a radial tire and to produce high-performance tires, the present invention proposes a solution in which the transverse and longitudinal rigidities of at least one sidewall are increased, based on the principle of an additional reinforcement ring in at least one sidewall.

The tire according to the invention comprises a tread, two beads, and two sidewalls radially interconnecting the tread and the beads, each bead having at least one annular anchoring element, a carcass reinforcement comprising at least one ply of reinforcing elements parallel to one another within the ply and making with the circumferential direction an angle $\alpha$ such that $60° \leq \alpha \leq 90°$, the at least one ply being anchored in each tire bead to at least one annular anchoring element, a crown reinforcement radially surmounting the carcass reinforcement, and an inextensible reinforcement ring in at least one of the sidewalls, wherein, when the tire is viewed in meridian section fitted on its operating rim and inflated to the recommended pressure, the inextensible reinforcement ring is located axially inside the at least one carcass reinforcement ply, and a profiled element of rubber mixture is positioned radially between the annular anchoring element in the bead of the at least one of the sidewalls and the inextensible reinforcement ring, and is located axially inside the ply.

"Annular anchoring element in the bead" means any element that absorbs the tensile stresses in the carcass reinforcement produced by the inflation pressure. As is known in its own right, the element can be a bead wire, generally formed of circumferential cords or cables, or more generally a stack of several strips of cords or cables, which make with the circumferential direction an angle of zero or at most 10°. As is known, anchoring is effected by adhesion over a sufficient length of the carcass reinforcement to the annular element, and the adhesion surface can be of semi-toroidal shape (as is the case when the carcass reinforcement is wrapped around a covered bead wire), or it can be a cylindrical or frustoconical surface or a surface in the shape of a circular crown (as is the case when a carcass reinforcement is adhesively bonded to or inserted between one (or more) strip(s) of circumferential or quasi-circumferential cords or cables).

The inextensible reinforcement ring is preferably located radially a distance H2 away from the base of the bead which is larger than one-third of the height H of the tire on its rim, which enables the meridian profile of the carcass reinforcement to be modified, particularly in the shoulder area of the tire.

The inextensible reinforcement ring can take several forms: it can be a monofilament with more or less large cross-section dimensions; it can be in the form of a braided assembly, whether this be a bead wire or an actual cable; or it can be in the form of a stack of circumferential cords or cables and the stack can be parallel to the equatorial plane or parallel to a radial plane.

In an equivalent way, the additional ring can be made of a single material having an appropriate tensile rigidity in all cases greater than the average rigidity of rubber mixtures. In particular, the additional ring may be made of a plastic material, polyurethane, aromatic polyamide, resin reinforced with various fibers (carbon, glass, etc.), or even of metal. The additional ring can also comprise two or more materials.

The additional ring can be hollow, to reduce the weight.

In an also equivalent manner, the additional sidewall ring and the profiled element of rubber mixture can be integrated in a single element, which can for example be produced independently of the fabrication of the tire itself and can then be incorporated in the tire at the time of its fabrication.

This single element can be made of a single material or of a composite material (i.e. a material comprising a matrix strengthened by reinforcements so as to confer upon the element the appropriate rigidities). When the single element is used instead of an additional ring and a profiled element of rubber mixture, its cross-section will be appropriate to obtain the rigidity desired and hence the mechanical effect sought in the tire. Of course, to obtain a good bond between the single element and the rubber mixtures of the tire, the surface of the element can be treated to improve adhesion. Orifices can also be made through the element to allow the passage of the rubber mixtures of the tire during its molding and vulcanization.

An essential feature of the invention is the mechanical coupling produced between the additional sidewall ring and the tire bead, by means of the profiled element of rubber mixture which extends the ring radially inwards.

To derive maximum benefit from this mechanical coupling effect, the profiled element of rubber mixture axially inside the axially outer carcass ply has a Shore A hardness at least equal to 65, so that its resistance to compression stresses is good.

The transverse rigidity of the tire is a function of the inclination of the line segment joining the centers of gravity of the meridian sections of the bead anchoring elements and the additional sidewall ring. It is advantageous for the line segment to make an angle φ with the axial direction, which is open radially and axially towards the outside and is at most equal to 70°.

To increase the efficacy of force and torque transmission, the carcass reinforcement comprises at least two plies of reinforcing elements parallel to one another in each ply and making an angle between 60° and 90° with the circumferential direction, at least one of the plies being anchored in each bead by wrapping around the anchoring element, and the second ply, called the axially inner ply, being located axially inside the additional sidewall ring and profiled element of rubber, between the additional ring and the anchoring element in the bead.

It is advantageous for the carcass reinforcement to have three carcass plies:

the axially outer ply, which is preferably discontinuous and is composed of two half-plies of radial, textile reinforcing elements parallel to one another in each half-ply and making with the circumferential direction an angle that can be between 80° and 90°, each half-ply having, on the one hand, a radially upper end under the edge of the crown reinforcement and, on the other hand, a radially lower edge with its end at the level of the anchoring element in the bead, and being arranged axially outside the profiled element between the anchoring element and the sidewall ring, outside the sidewall ring and on the outside, in the upper sidewall, two main carcass plies, axially on the inside, formed of textile reinforcing elements crossed from one ply to the next so as to make with the circumferential direction angles of between 60° and 80°, and being wrapped within each bead around the anchoring element to form upturns axially outside the edge of the axially outer carcass ply.

Preferably, the carcass reinforcement plies are formed of textile reinforcing elements such as aliphatic or aromatic polyamide, polyester, or rayon, which are parallel to one another in each ply.

The structure of each bead can be completed by at least one additional reinforcement armature. This is composed of at least one ply of textile and/or metallic elements which make with the circumferential direction an angle between 0° and 45°, such ply being arranged either outside or inside the main plies of the carcass reinforcement, inside or outside the axially outer ply.

The thickness of the rubber profiled element between the main carcass reinforcement and the additional ply, measured perpendicularly to the line joining the centers of gravity of the anchoring element and the additional ring, is a minimum essentially at the level of the element and ring, and maximum approximately towards the geometrical middle of the profiled element. Viewed in cross-section, the rubber profiled element has an elongated and almost rectilinear or substantially rectilinear shape, and its maximum thickness is at least equal to 3% of the height of the tire on its rim.

BRIEF DESCRIPTION OF THE DRAWINGS

The characteristics and advantages of the invention will be better understood with the help of the drawing attached to the description, which comprises only one FIGURE in partial cross-section illustrating a non-limiting example embodiment of a tire according to the invention.

DETAILED DESCRIPTION OF EXEMPLARY EMBODIMENTS

Figure 1:
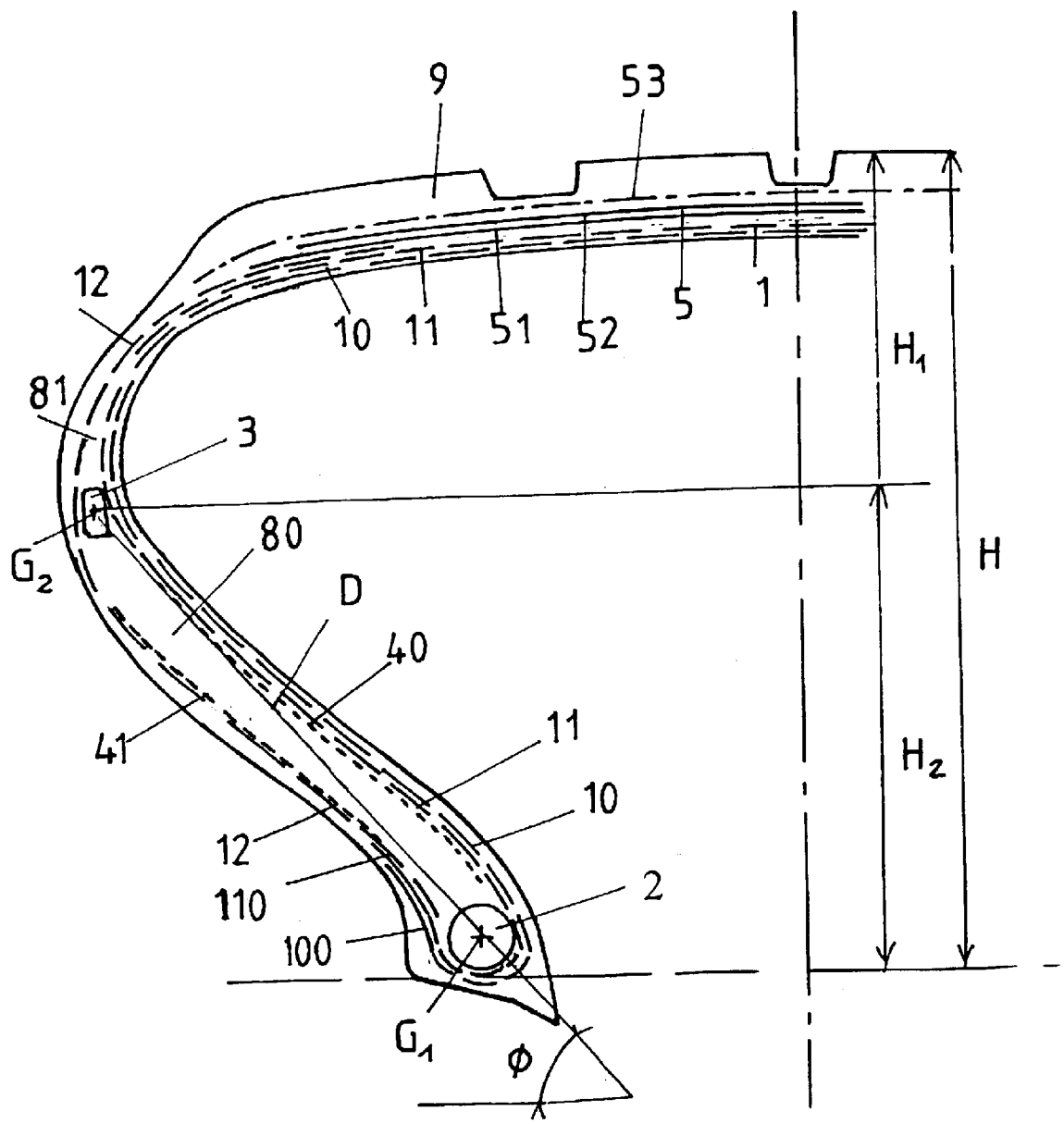

The tire shown in FIG. 1 is a tire designed for fitting to a top-of-the-range vehicle. Viewed in meridian section, the tire comprises a tread 9 connected to its tire beads by two sidewalls. It is reinforced by a carcass reinforcement 1 comprising two plies 10 and 11, axially on the inside and called the main plies, which are continuous from one bead to the other and are anchored in each bead to a bead wire 2 of the braided type to form upturns 100 and 110. The plies 10 and 11 comprise aliphatic polyamide cables parallel to one another in each ply 10 or 11 and crossed from one ply 10 to the next 11, making with the circumferential direction an angle of 74°, such angle being measured in the equatorial plane of the tire. Two carcass half-plies 12 axially on the outside complete the reinforcement 1 and are formed of the same elements as those constituting the main plies 10 and 11. Each half-ply 12 has a radially lower end located slightly above the line parallel to the rotation axis and tangential to the contour of the bead wire 2, and a radially upper end located under the edge of the crown reinforcement 5. The crown reinforcement 5 is radially under the tread and comprises a working reinforcement comprising two plies 51 and 52 of aromatic polyamide cables, crossed from one ply 51 to the next 52 and making an angle of 34° with the circumferential direction. The axial widths of the working plies 51 and 52 are unequal but essentially equal to the width of the tread 9. They are surmounted radially by a ply 53 of width equal to the two above widths, which is obtained by winding a cable of aromatic polyamide, which confers upon it an approximately circumferential direction.

An additional, inextensible reinforcement ring 3 is arranged in each sidewall of the tire, and the center of gravity G2 of its meridian section is radially located a distance H2 from the base of the tire bead equal to 59% of the height H of the tire (measured when the tire is mounted on a rim and inflated to the recommended pressure, relative to the base of the bead which is also the base of the rim).

"Inextensible ring" means a ring which, under a circumferential tensile force equal to 10% of its rupture force, shows a relative elongation equal to at most 1%. The base of a tire bead is conventionally the line parallel to the rotation axis of the tire and passing through the point of intersection of the trace of the vertical wall of the tire with the generatrix of the bead seat.

The additional ring 3 divides the sidewall reinforced by the carcass reinforcement; on the one hand, axially and, on the other hand, radially into two distinct parts. The axially inner part is the part of the sidewall that is reinforced by the main carcass plies 10 and 11, while the axially outer part is reinforced by the carcass half-ply 12. Similarly, the radially upper part, of smaller radial height H1, is the part in which the carcass plies 10, 11 and 12 are almost superimposed axially, except in the area, as small as possible, of the profiled element 81, and where the thickness of the tire's sidewall is small, which corresponds to what is usually called a pneumatic part of the sidewall. The second, radially lower part, of larger radial height H2, is the part in which the carcass plies 10, 11 and 12 are axially separated by a profiled rubber mixture element 80 of large thickness and high Shore A hardness equal to 80. This radially lower part corresponds to what is usually called a structural part. The Shore A hardness is determined in accordance with the standard ASTM D2240.

The thickness of the profiled element 80, which is a maximum essentially at its middle, is in the case considered equal to 8 mm and corresponds to 4.8% of the height H. The second, radially lower part is markedly inclined relative to the axial direction. It is accepted that the inclination of the radially lower part is represented by the direction of the line D joining the centers of gravity of the meridian sections respectively G1 of the anchoring bead wire 2 and G2 of the additional ring. The line D makes with the axial direction an angle φ which is open axially and radially outwards and is at most equal to 70°, and in the case described is equal to 56°. In addition, the radially lower part is reinforced, not only by the three carcass plies 10, 11 and 12, but also by the additional reinforcements 40 and 41. The reinforcement 40 comprises a single ply of steel reinforcing elements which make with the circumferential direction an angle of 45° and forms a triangulation with the two main carcass plies 10 and 11, which improves the resistance to compression forces of the radially lower part. Similarly, the additional reinforcement 41, comprising a single ply of the same elements as before with the same orientation, reinforces the carcass half-ply 12 of the axially outer part.

The rubber profiled element 81, located axially between the two plies turned up around the anchoring bead wire and the additional half-ply, offers high resistance to compression forces and therefore very greatly reduces the amplitude of axial displacement that is possible for the sidewall ring. This results in a very high ratio, at low slip angles, between the transverse force developed between the ground and the tire and the vertical force applied.

It does not go beyond the scope of the invention if other additional reinforcements are added in the sidewalls of the tire considered, for example a ply of reinforcing elements wound around the sidewall ring 3 to form two strips radially above such ring, these being axially adjacent strips that can advantageously replace the rubber profiled element 81 between the plies 10, 11 and 12.

In the case of a tire according to the invention only one sidewall of which comprises an additional ring coupled to a profiled element, it is advantageous to fit the tire on a vehicle with the one sidewall facing the outside of the vehicle, so as to reduce lateral displacements when cornering.

In addition, as a function of the overall dimensions required when the tire is fitted on its mounting rim, the presence of an additional sidewall ring combined with high rigidity of the lower part of the sidewall allows the use of a rim narrower than the rim normally used for the same tire size. This results in an appreciable weight saving for the rolling assembly, lower cost, and better protection of the rim.

The essentially pneumatic structure of the upper part of the sidewall also makes it easier for the tread to rest flat against the ground. This increases the contact area between the tire and the ground, while preserving standardized dimensions for the tire. The increased volume of tread rubber brought into play has many advantages, in particular an improvement of all performance aspects related to the contact between tire and ground: grip, wear, production of heat, behavior, to name only the most markedly influenced performance aspects.

What is claimed is:

1. A tire comprising a tread, two beads, and two sidewalls radially inter-connecting said tread and said beads, each bead having at least one annular anchoring element, a carcass reinforcement of at least one ply of reinforcing elements parallel to one another within said ply and making with the circumferential direction an angle α such that $60° < \alpha < 90°$, said at least one ply being anchored in each tire bead to a respective annular anchoring element, a crown reinforcement radially surmounting said carcass reinforcement, and an inextensible reinforcement ring in at least one of said sidewalls, wherein, when said tire is viewed in meridian cross-section fitted on its operating rim and inflated to the recommended pressure, said inextensible reinforcement ring is located radially a distance H2 from the base of the bead of said one sidewall, said distance H2 being larger than one-third of the height H of said tire on its rim, wherein said at least one carcass reinforcement ply is axially outside of said inextensible reinforcement ring, and a profiled element of rubber mixture is located radially between said annular anchoring element in the bead of said one sidewall and said inextensible reinforcement ring, and is located axially inside of said at least one carcass reinforcement ply.

2. The tire according to claim 1, wherein said carcass reinforcement is formed of at least two plies of reinforcing elements parallel to one another within each ply and making with the circumferential direction an angle $\alpha$ such that $60°<\alpha<90°$, said at least one of said at least two plies being anchored in each bead by wrapping said at least one ply around the anchoring element in the bead, a second ply of said at least two plies being an axially inner ply located axially inside of said inextensible reinforcement ring and said profiled rubber element and radially between said inextensible reinforcement ring and said anchoring element in the bead.

3. The tire according to claim 2, wherein said carcass reinforcement comprises a third, axially inner ply formed of reinforcing elements crossed with respect to said reinforcing elements of said at least one ply axially outside of said inextensible reinforcement ring and making with the circumferential direction angles of between 60° and 80°, said third ply being wrapped around said anchoring element in each bead to form an upturn.

4. The tire according to claim 3, wherein said carcass plies are formed of textile elements, which are parallel to one another within each ply.

5. The tire according to claim 3, wherein said crown reinforcement comprises an edge, wherein said at least one ply axially outside of said inextensible reinforcement ring is discontinuous and is composed of two half-plies of radial, textile reinforcing elements which make with the circumferential direction an angle between 80° and 90°, each half-ply having a radially upper end under said edge of said crown reinforcement and a radially lower edge having an end at the level of said anchoring element.

6. The tire according to claim 5 wherein said anchoring element comprises a meridian section having a center of gravity $G_1$ and said inextensible reinforcement ring comprises a meridian section having a center of gravity $G_2$, wherein the line segment D joining said two centers of gravity $G_1$, $G_2$ makes with the axial direction an angle $\phi$ of at most 70°.

7. The tire according to claim 6 wherein said profiled element of rubber mixture between said anchoring element and said inextensible reinforcement ring has a Shore A hardness of at least 65.

8. The tire according to claim 7 wherein, viewed in cross-section, said profiled element has an elongated and substantially rectilinear shape and has a maximum thickness equal to at least 3% of the height H of the tire on its rim.

9. The tire according to claim 1, wherein said anchoring element comprises a meridian section having a center of gravity $G_1$ and said inextensible reinforcement ring comprises a meridian section having a center of gravity $G_2$, wherein the line segment D joining said two centers of gravity $G_1$, $G_2$ makes with the axial direction an angle $\phi$ of at most 70°.

10. The tire according to claim 1, wherein said profiled element of rubber mixture between said anchoring element and said inextensible reinforcement ring has a Shore A hardness of at least 65.

11. The tire according to claim 1, wherein, when viewed in cross section, said profiled element has an elongated and substantially rectilinear shape and has a maximum thickness equal to at least 3% of the height H of said tire on its rim.

12. The tire according to claim 1, further comprising at least one additional reinforcement comprising at least one ply of additional reinforcing elements which make with the circumferential direction an angle of between 0° and 45°, said at least one ply of additional reinforcing elements being arranged either axially inside or axially outside the at least one ply of reinforcing elements.

13. The tire according to claim 12, wherein said at least one ply of additional reinforcing elements is arranged axially outside the at least one ply of reinforcing elements.

14. The tire according to claim 12, wherein said at least one ply of reinforcing elements of the at least one additional reinforcement is arranged axially inside the at least one ply of reinforcing elements.

15. The tire according to claim 1, further comprising at least one additional reinforcement comprising at least one ply of additional reinforcing elements which make with the circumferential direction an angle of between 0° and 45°, said at least one ply of additional reinforcing elements being arranged inside said at least one ply of reinforcing elements.

16. A tire comprising a tread, a first bead, a second bead, a first sidewall radially inter-connecting said tread and said first bead, a second sidewall radially interconnecting said tread and said bead, each bead having at least one annular anchoring element, and a carcass reinforcement of at least one ply of reinforcing elements parallel to one another within said at least one ply and making with the circumferential direction an angle $\alpha$ such that $60°<\alpha<90°$, said at least one ply being anchored in each bead to a respective annular anchoring element, a crown reinforcement radially surmounting said carcass reinforcement, said first sidewall being provided with an inextensible reinforcement ring, wherein when the tire is viewed in meridian cross section mounted on its operating rim and inflated to the recommended pressure, said inextensible reinforcement ring is located radially a distance H2 from the base of the first bead greater than one-third of the height H of the tire on its rim, and said at least one ply is located axially outside of said inextensible reinforcement ring, a profiled element of rubber mixture being located radially between said anchoring element in said first bead and said inextensible reinforcement ring, and located axially inside said at least one ply, said tire being intended for fitting to a vehicle so that said first sidewall provided with said inextensible reinforcement ring is on the outside of said vehicle.

* * * * *